July 14, 1925.

J. M. SUTTON

AUTOMOBILE SIGNAL

Filed Jan. 10, 1925

1,545,862

Inventor
John M Sutton,
By
Clarence A. O'Brien
Attorney

Patented July 14, 1925.

1,545,862

UNITED STATES PATENT OFFICE.

JOHN M. SUTTON, OF RICHMOND, VIRGINIA.

AUTOMOBILE SIGNAL.

Application filed January 10, 1925. Serial No. 1,658.

*To all whom it may concern:*

Be it known that I, JOHN M. SUTTON, a citizen of the United States, residing at Richmond, in the county of Henrico and State of Virginia, have invented certain new and useful Improvements in Automobile Signals, of which the following is a specification.

This invention relates to improvements in automobile signals and has for its primary object to provide a simple and efficient device which may be readily and easily secured in position on an automobile, whereby a signaling means is adapted to be actuated for indicating to approaching or pursuing vehicles, the direction or course to be followed by the vehicle upon which the signal is mounted.

One of the important objects of the present invention is to provide an automobile signal of the above mentioned character, wherein the actuating means thereof is supported in close proximity to the operator so as to render the actuation of the signaling means positive as well as efficient, and further obviating the necessity of the operator having to place his hand outside of the car, in order to give the proper signal when a turn in either direction is to be made.

A further object is to provide an automobile signal of the above mentioned character, which includes a pair of signal arms disposed on opposite sides of the automobile body, the same being normally disposed in an inoperative position, manually actuated means being provided within easy access of the operator for moving the desired signal to an operative position, depending upon the course to be followed.

A further object is to provide an automobile signal of the above mentioned character, which is simple in construction, inexpensive, strong and durable, and further well adapted for the purpose for which it is designed.

In the accompanying drawing, forming a part of this application, and in which like numerals designate like parts throughout the same:

Figure 1:
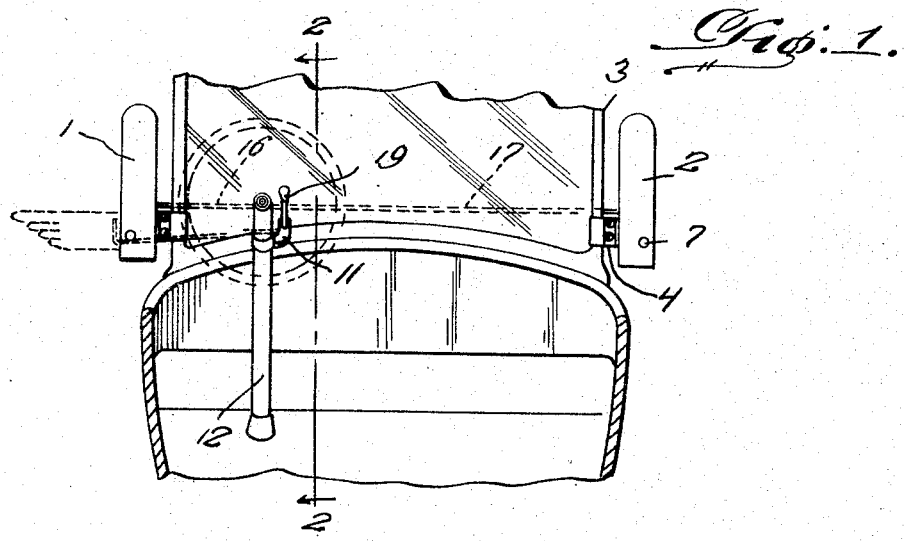
Figure 1 is an elevational view of the automobile signal embodying my invention, showing the manner in which the same is mounted upon an automobile.
Figure 2:
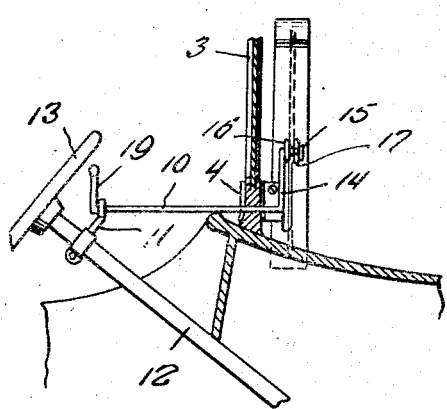
Figure 2 is a sectional view, taken approximately upon the line 2—2 of Figure 1, looking in the direction of the arrows.
Figure 4:
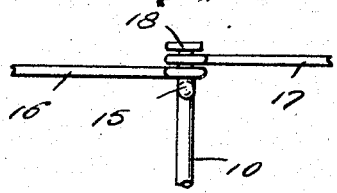
Figure 4 is a detail plan view of the crank portion of the lever and the adjacent ends of the elongated rods, associated therewith.

In the drawing, wherein for the purpose of illustration is shown the preferred embodiment of my invention, the numerals 1 and 2 designate a pair of casings which are secured on the opposite sides of the axial frame 3 of an automobile, by any suitable clamping means, indicated generally by the numeral 4. The outer side of each of the casings is open. A pair of signal arms 5 and 6 are pivotally supported adjacent their lower outer ends in the casings 1 and 2 respectively, as indicated at 7. The outer free ends of each of the signal arms is shaped preferably in the form of a hand, although it is to be understood that a signal arm may be of any other design, and I do not wish to limit myself to the particular character of design to be employed. The signal arms are provided with the transversely extended slots 8 and 9 respectively, and the purpose thereof will be hereinafter more fully described.

The laterally extending lever 10 has its forward portion disposed through the bottom of the windshield frame, while the rear portion of the lever is journaled in a suitable bracket 11, the latter being supported on the steering post 12 of the automobile, directly below the steering wheel 13. This construction affords a means whereby the lever 10 may be rotated. The forward end of the lever 10 is disposed upwardly, as illustrated at 14, and then forwardly, as indicated at 15, whereby a crank is formed, and the purpose thereof will be presently apparent.

An elongated pair of rods are operatively associated at their outer ends in the transverse slots provided in the signal arms 5 and 6 respectively, while the inner ends of the rods are secured to the forwardly extending portions 15 of the crank, formed on the forward end of the laterally extending rotatable lever 10. A head 18 is formed on the free end of the forwardly extending portion 15 to prevent the accidental displacement of the adjacent ends of elongated rods therefrom. The rear end of the lever 10 is disposed upwardly, as illustrated at 19, to previde a handle portion for actuating the lever, and the elongated rod connected thereto.

Normally the signal arms are disposed within the respective casings, so that the same are not visible. Assuming that the operator of the vehicle desires to make a left hand turn, the handle 19, which is within easy access of the operator is turned to the left, simultaneously causing the lever 10 to rotate, and moving the crank formed on the forward end of the lever toward the left. The lever 16 will then be moved laterally, so that the outer end thereof will move in the slot 8 of the signal arm 5, until the same is disposed within the downwardly disposed portion 20 of said slot, whereby the signal member 5 will be caused to swing outwardly of the casing 1 on its pivot 7, so as to be disposed in a substantially horizontal position, and thereby giving an indication to pursuing as well as approaching vehicles of the directional course to be followed by the automobile upon which the signal is mounted.

Figure 3:
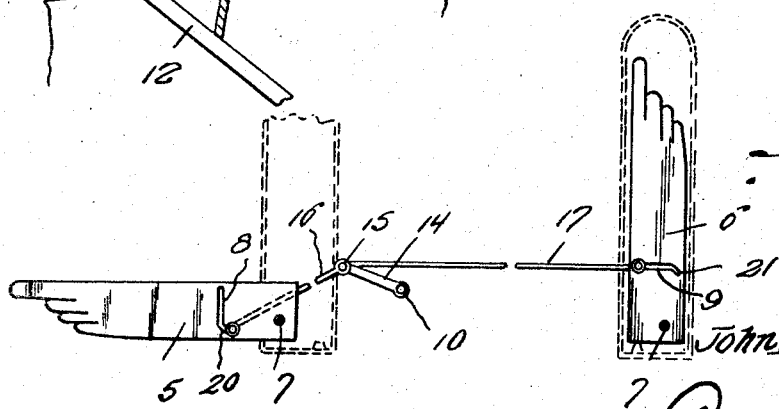
Figure 3 is a fragmentary view of the signal arms and the actuating means therefor, one of the signal arms being disposed in an operative position.

After the automobile has made a left hand turn, the hand 19 is swung upwardly, causing an inward movement of the rod 16, whereby the signal arm 5 is returned to its normal inoperative position within the casing 1. When it is desired to make a right hand turn, the handle 19 is swung in the opposite direction, causing the crank on the forward end of the lever to be disposed to the right, whereby the arm 17 is moved outwardly, causing the outer end thereof to travel in the slot 9 of the signal arm 6, until the same is disposed in the downwardly extending portion 21 of the slot, whereby a further outward movement of the rod 17 will cause the signal arm 6 to be swung outwardly to an operative position on its pivot. By returning the handle 19 to its normal position, the signal member 6 will be moved to an inoperative position and disposed entirely within the casing 2. The provision of the slot in the respective signal arms to permit a slight movement of the rod so that when one of the signal arms has been actuated and is to be returned to its normal inoperative position, the other signal arm will not be moved to an operative position. This is obvious from the construction illustrated more clearly in Figure 3 of the drawing.

It will thus be seen from the foregoing description that an automobile signal has been provided, which is of such construction as to permit the same to be readily and easily installed on an automobile, and will not in any way interfere with the usual operation of the steering wheel. Furthermore, by positioning the handle 19 below the steering wheel, the same is, at all times, within easy access of the operator. Furthermore, the provision of an automobile signal of the above mentioned character will obviate any necessity of the driver having to place his hand outside of the car, when a turn is to be made, in order that approaching or pursuing vehicles may be warned of such course as to be followed by the automobile.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

An automobile signal comprising a pair of pivotally mounted signal arms, each of said signal arms being provided with a transversely extending slot adjacent the pivoted end thereof, and the end of the slot being offset adjacent the outer edge of said signal arm and disposed toward the pivoted end thereof, a pair of elongated arms having their outer ends disposed in the transverse slots of the respective signal arms, and means for actuating the rods simultaneously whereby the signal arms are operated independently for moving the same into an operative or inoperative position.

In testimony whereof I affix my signature.

JOHN M. SUTTON.